Dec. 16, 1952 D. H. BOWDER 2,621,386
SEPARABLE PIN FASTENER
Filed April 7, 1950
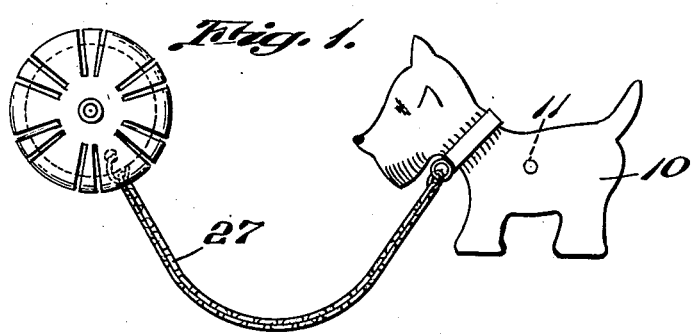
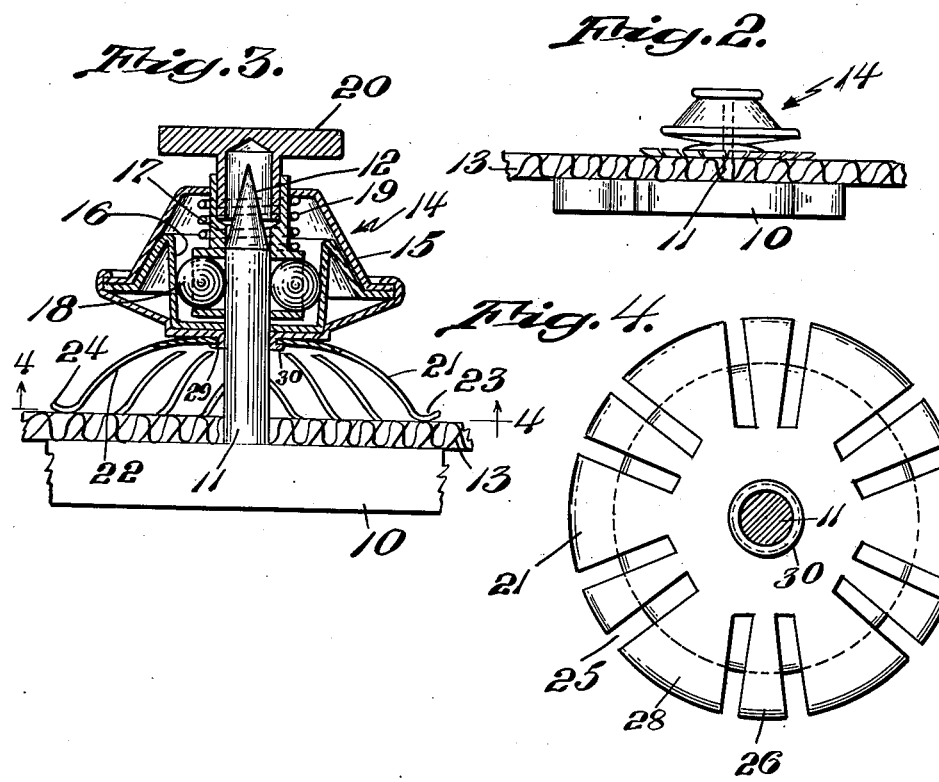
INVENTOR.
David H. Bowder
BY
Barlow & Barlow
ATTORNEYS.

Patented Dec. 16, 1952

2,621,386

UNITED STATES PATENT OFFICE 2,621,386

SEPARABLE PIN FASTENER

David H. Bowder, Attleboro, Mass., assignor to Swank, Inc., a corporation of Delaware Application April 7, 1950, Serial No. 154,710

1 Claim. (Cl. 24—155)

The invention relates to a jewelry ornament of the type having a pin shank which pierces a piece of fabric and is secured in place by a clutch which grips the pin shank.

Heretofore when an ornament such as a dog or the like was held on an article of clothing by a single pin shank piercing the clothing and being gripped by a clutch on the back to prevent the pin shank from being withdrawn from the clothing, the ornament would rotate about the pin shank as an axis, and the dog, instead of being right side up, might be at some other angle.

One of the objects of the invention is to provide a device which will prevent the ornament from rotating about the pin shank, and thus maintain the position in which it is set.

Another object of the invention is to provide a resiliently arched plate which will serve to provide pressure between the rear surface of the ornament and the fabric to prevent such turning.

Another object of the invention is to provide a member which may easily be assembled with a clutch engaging the pin shank.

With these and other objects in view, the invention consists of certain novel features of construction as will be more fully described and pointed out in the appended claim.

Figure 1 is an elevation showing the ornament and the face surface of the device which is the subject of this invention.

Figure 2 is a plan view illustrating the fabric in section, but showing the relationship of the parts on either side of the fabric.

Figure 3 is a sectional view through the clutch and the securing plate and fabric while showing the ornament in full.

Figure 4 is a view on substantially line 4—4 of Figure 3.

In proceeding with this invention, I provide an extremely resilient arched plate which is secured to the clutch which holds the pin shank. The relationship of the parts being such that the plate will force the fabric through which the pin stem extends against the rear surface of the ornament with sufficient pressure to prevent the ornament from turning about the pin shank as an axis.

With reference to the drawings, 10 designates an ornament which in the showing herein is in the form of a dog, and from the rear surface of this ornament there extends a pin shank 11, pointed at 12, to pass through fabric 13. A clutch of usual formation is designated 14 and comprises a body 15 having a tapered chamber 16 in which there is a cage 17 which carries balls 18. A spring 19 forces the cage inwardly so that the balls will press against the shank 11, and hold thereon. If it is desired to release the clutch, the handle 20 of the cage is moved outwardly against the spring pressure to release the balls and permit the clutch to be pulled from the pin shank.

The plate which is the subject of this invention is designated 21 and is formed of extremely resilient beryllium steel, the same being circular and arched as at 22 so that portions 23 adjacent its edge will provide a pressure point for engagement with a piece of fabric, as at 13. The very edge is rolled outwardly, as at 24, so that a smooth pressure surface is provided. In order to increase the resiliency, a number of radial slots 25 are formed, extending from the peripheral edge inwardly, as shown in Figure 4, so that the portions 26 and 28 between these slots have added resiliency. This plate is attached to the clutch 14 by collar 29 extending through a central hole in the plate and headed over as at 30.

The clutch may be attached to the ornament by chain, such as 27, as shown in Figure 1.

In use the pin shank 11 of the ornament is passed through a piece of fabric 13 and the clutch is forced into position over the shank in the usual manner. The resilient plate engages the back of the fabric and presses it against the ornament 10 over a sufficiently wide area so that a good friction hold is provided and when so held, the ornament will not jar out of position, but will remain right side up, or in any other position in which it is set on the fabric.

I claim:

In combination an ornament having a shank extending from and substantially perpendicular to its rear surface, a clutch to grip said shank axially movable without rotation relative to said shank and an arched resilient plate of a diameter larger than said clutch with its center engaging said clutch, said plate being slotted at its edge to provide a plurality of resilient portions to urge a piece of fabric against said rear surface and become resiliently flexed and be held under such flexure between the clutch and fabric surface to apply sufficient pressure on the fabric to prevent the ornament from turning about said shank as an axis.

DAVID H. BOWDER.

REFERENCES CITED

The following references are of record in the file of this patent:

UNITED STATES PATENTS

| Number | Name | Date |
|---|---|---|
| 404,284 | Johnson | May 28, 1889 |
| 561,893 | Jansky | June 9, 1896 |
| 818,530 | Fischer | Apr. 24, 1906 |
| 1,471,570 | Peterson | Oct. 23, 1923 |
| 1,472,681 | Joy | Oct. 30, 1923 |
| 2,123,935 | Dole | July 19, 1938 |
| 2,130,826 | Franks | Sept. 30, 1938 |
| 2,320,947 | Martin | June 1, 1943 |
| 2,354,638 | Okerholm | July 25, 1944 |
| 2,356,310 | Gass | Aug. 22, 1944 |
| 2,402,925 | Martin | June 25, 1946 |
| 2,429,069 | Murray | Oct. 14, 1947 |

FOREIGN PATENTS

| Number | Country | Date |
|---|---|---|
| 463,551 | Germany | July 30, 1928 |